Feb. 4, 1941.                A. K. FISCHER                2,230,973
                               ROTAMETER
                           Filed May 27, 1938
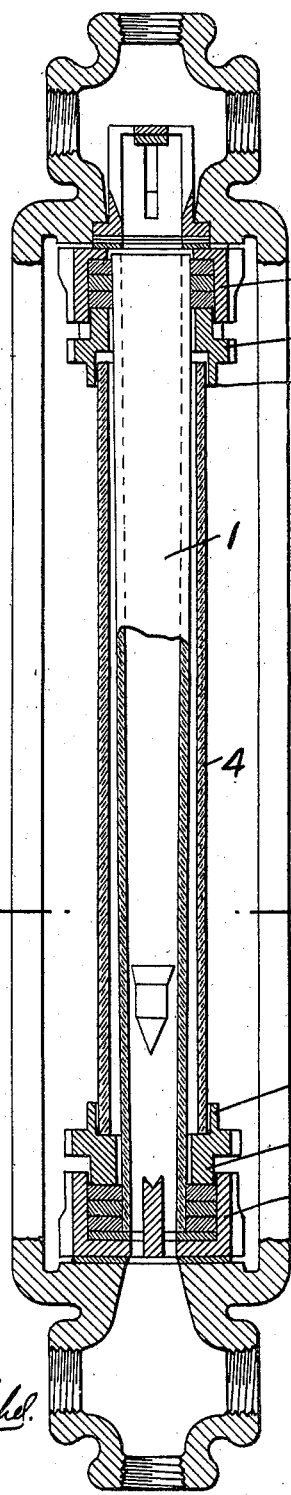
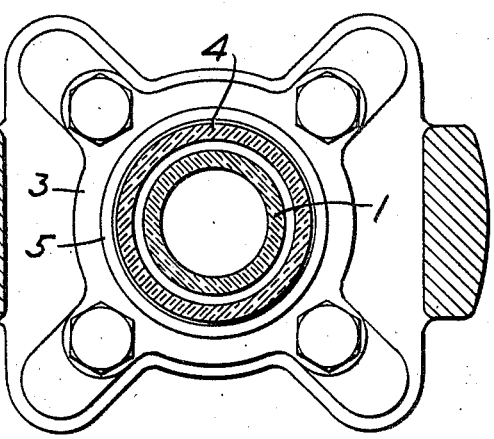
INVENTOR
Adelbert K. Fischer
BY
Augustus B. Stoughton
ATTORNEY.

Patented Feb. 4, 1941

2,230,973

UNITED STATES PATENT OFFICE 2,230,973

ROTAMETER

Adelbert K. Fischer, Philadelphia, Pa., assignor to Schutte & Koerting Company, Philadelphia, Pa., a corporation of Pennsylvania Application May 27, 1938, Serial No. 210,417

1 Claim. (Cl. 73—209)

The principal object of the present invention is to protect the tapered glass tubes of rotameters against accidental breakage from the outside and also to reduce the accident hazard in case the tapered glass tubes burst.

Another object of the invention is to provide comparatively simple and inexpensive means for equipping rotameters with such protection.

It may be remarked that the tapered tubes are important parts of an instrument of precision and therefore their form is of the utmost importance. Experience has proven that glass is practically the only material with which the required precision of form can be obtained but glass while sufficiently transparent is relatively friable and easily broken when tubes are struck from the outside and, therefore, its strength is limited so that when these glass tubes burst from internal pressure they create an accident hazard. Of course there are materials which are transparent and sufficiently strong to resist accidental blows and internal pressure but they do not lend themselves to the production of tapering tubes of the necessary precision and accuracy of form.

The present invention comprises a rotameter tube of transparent material adapted for production in the required tapering form but relatively friable and a cylindrical tube enclosing the tapering tube and of transparent material adapted for production in cylindrical form but not in the required tapering form and relatively non-friable.

The invention also comprises the improvements to be presently described and finally claimed.

In the following description reference will be made to the accompanying drawing forming part hereof and in which, Figure 1 is a vertical sectional view of a rotameter embodying features of the invention, and Figure 2 is a sectional view taken on the line 2—2 of Fig. 1 and drawn to an enlarged scale.

Referring to the drawing 1 is a tapering tube of glass or other transparent material adapted for production in tapering form but necessarily relatively friable. This tube 1 is arranged in the path of the liquid or fluid to be measured and is mounted in stuffing boxes 2 having glands 3. 4 is a cylindrical tube enclosing the tapering tube 1 and it is of transparent material adapted for production in cylindrical form but not in tapering form and the material is relatively non-friable. The cylindrical tube 4 may be made of synthetic material such as Lucite supplied by the Du Pont Company; Celluloid made by the Celluloid Company; and Plexiglas made by Rohm & Haas Company in Philadelphia. This cylindrical tube 4 surrounds the taper tube 1 and is mounted at its ends in flanges 5 provided on the glands 3.

By the described conjoint use of two materials of which one is susceptible of production with the required degree of accuracy and in the required tapering form and of which the other is incapable of production in the required tapering form but may be readily produced in cylindrical form and by the discovery that while one of them is lacking in strength the other of them is sufficiently strong, there is produced a transparent tube structure for rotameters which permits them to perform their required precision of measurement and at the same time protects those employed in and around them from accidental injury in the event of the bursting of the tapering tube.

It may be remarked that the tube 4 is spaced from the tube 1 and is supported by the non-breakable frame of the instrument, so that if the non-breakable metal frame of the instrument receives a shock from the outside the shock is resisted by the comparatively non-friable tube 4. Similarly a blow on the tube 4 is resisted by it and the glass tube 1 is not broken.

The tube 4 is placed in position by first inserting into it the tube 1 then the stuffing boxes 2 are applied to the ends of the tube 1 and the flanges 5 on the glands 3 are placed on the ends of the tube 4; then the assemblage is inserted sidewise between the columns shown as crosshatched in Figure 2 and mounted in proper position; then the bolts whose heads are shown in Figure 2 are tightened in respect to the end fittings. The tube 4 is shown as somewhat shorter than the vertical distance between the upper flange 5 and the bottom of the lower flange 5. The tube 4 is not held in position in vertical direction but is held by the flanges 5 in sidewise direction. This is descriptive of the structure shown in the drawing for the sake of illustration.

It will be obvious to those skilled in the art to which the invention relates that modifications may be made in details of construction and arrangement without departing from the spirit of the invention which is not limited otherwise than as the appended claim may require.

I claim:

In a rotameter for measuring the flow of a fluid the combination of a tapering tube of transparent but relatively friable material, a cylindrical tube enclosing the tapering tube and so arranged that the fluid does not flow through it and of relatively non-friable material, stuffing boxes for connecting the tapering tube in the flow path of the rotameter, a non-breakable frame supporting said stuffing boxes, and glands forming part of the stuffing boxes and provided with flanges which support the cylindrical tube in position surrounding the tapering tube at an even distance from the tapering, friable tube without touching same thereby resisting any shocks from the outside with the non-breakable frame of the rotameter.

ADELBERT K. FISCHER.